(12) United States Patent
Reymond et al.

(10) Patent No.: US 8,951,617 B2
(45) Date of Patent: Feb. 10, 2015

(54) SUBSTRATE PROVIDED WITH A MULTILAYER COATING HAVING THERMAL PROPERTIES AND ABSORBENT LAYERS

(75) Inventors: Vincent Reymond, Antony (FR); Hadia Gerardin, Paris (FR); Sylvain Belliot, Paris (FR); Veronique Rondeau, Asnieres sur Seine (FR); Eric Petitjean, Les Lilas (FR)

(73) Assignee: Saint-Gobain Glass France, Courbevoie (FR)

( * ) Notice: Subject to any disclaimer, the term of this patent is extended or adjusted under 35 U.S.C. 154(b) by 851 days.

(21) Appl. No.: 13/141,462

(22) PCT Filed: Dec. 22, 2009

(86) PCT No.: PCT/FR2009/052664
§ 371 (c)(1),
(2), (4) Date: Aug. 30, 2011

(87) PCT Pub. No.: WO2010/072974
PCT Pub. Date: Jul. 1, 2010

(65) Prior Publication Data
US 2011/0305853 A1 Dec. 15, 2011

(30) Foreign Application Priority Data
Dec. 22, 2008 (FR) .................... 08 58944

(51) Int. Cl.
*E06B 3/00* (2006.01)
*B32B 17/06* (2006.01)
(Continued)

(52) U.S. Cl.
CPC ............ *C03C 17/36* (2013.01); *C03C 17/3626* (2013.01); *C03C 17/3644* (2013.01);
(Continued)

(58) Field of Classification Search
CPC ..................................... E06B 3/6715
USPC ........... 428/34, 432, 433, 434, 698, 699, 701, 428/704; 52/786.1, 786.11, 786.13; 156/109
See application file for complete search history.

(56) References Cited

U.S. PATENT DOCUMENTS

| 4,450,201 A | 5/1984 | Brill et al. |
| 5,993,950 A | 11/1999 | Novis et al. |

(Continued)

FOREIGN PATENT DOCUMENTS

| FR | 2 751 666 | 1/1998 |
| WO | 02 48065 | 6/2002 |

(Continued)

OTHER PUBLICATIONS

U.S. Appl. No. 13/978,042, filed Jul. 2, 2013, Laurent, et al.
(Continued)

*Primary Examiner* — Donald J Loney
(74) *Attorney, Agent, or Firm* — Oblon, Spivak, McClelland, Maier & Neustadt, L.L.P.

(57) ABSTRACT

The invention relates to a multiple glazing including at least two substrates, one substrate being coated on an inner face in contact with a gas-filled cavity with a thin-film multilayer coating having reflection properties in the infrared and/or in solar radiation, the coating including a metallic functional layer and at least two dielectric films, each including at least one dielectric layer, the metallic functional layer being placed between the two dielectric films, characterized in that the two dielectric films each include at least one absorbent layer which is placed in the dielectric film between two dielectric layers, the absorbent material of the absorbent layers being symmetrically placed on either side of the metallic functional layer.

20 Claims, 3 Drawing Sheets

(51) Int. Cl.
 *B32B 15/00* (2006.01)
 *C03C 17/36* (2006.01)
 *E06B 3/67* (2006.01)

(52) U.S. Cl.
 CPC ........... *C03C17/366* (2013.01); *C03C 17/3681* (2013.01); *E06B 3/6715* (2013.01); *C03C 2218/154* (2013.01)
 USPC ............. 428/34; 428/432; 428/433; 428/434; 428/698; 428/699; 428/701; 428/704; 52/786.1; 52/786.11; 52/786.13

(56) References Cited

U.S. PATENT DOCUMENTS

| | | | |
|---|---|---|---|
| 6,632,491 B1 * | 10/2003 | Thomsen et al. | 428/34 |
| 6,830,791 B1 * | 12/2004 | Misonou et al. | 428/34 |
| 7,166,360 B2 | 1/2007 | Constet et al. | |
| 2009/0169846 A1 | 7/2009 | Siddle et al. | |

FOREIGN PATENT DOCUMENTS

| | | |
|---|---|---|
| WO | 03 093187 | 11/2003 |
| WO | 2007 080428 | 7/2007 |

OTHER PUBLICATIONS

International Search Report issued Mar. 12, 2010 in PCT/FR09/052664 filed Dec. 22, 2009.
U.S. Appl. No. 13/141,460, filed Jun. 22, 2011, Reymond, et al.
U.S. Appl. No. 13/124,791, filed Jul. 8, 2011, Janssen, et al.

* cited by examiner

US 8,951,617 B2

SUBSTRATE PROVIDED WITH A MULTILAYER COATING HAVING THERMAL PROPERTIES AND ABSORBENT LAYERS

CROSS REFERENCE TO RELATED APPLICATIONS

The present application is the national stage of international application PCT/FR2009/052664, filed on Dec. 22, 2009, published as WO 2010/072974 on Jul. 1, 2010, the text of which is incorporated by reference, and claims the benefit of the filing date of French Application No. 0858944, filed on Dec. 22, 2008, the text of which is also incorporated by reference.

FIELD OF THE INVENTION

The invention relates to multiple glazing comprising at least two substrates, of the glass substrate type, which are held together by a frame structure, said glazing providing a separation between an external space and an internal space, in which at least one gas-filled cavity lies between the two substrates.

As is known, one of the substrates may be coated on an inner face in contact with the gas-filled cavity with a thin-film multilayer coating having reflection properties in the infrared and/or in solar radiation, said coating comprising a single metallic functional layer, in particular one based on silver or a metal alloy containing silver, and two dielectric films, said films each comprising at least one dielectric layer, said functional layer being placed between the two dielectric films.

The invention relates more particularly to the use of such substrates for manufacturing thermal insulation and/or solar protection glazing units. These glazing units may be intended for equipping buildings, especially with a view to reducing air-conditioning load and/or preventing excessive overheating (called "solar control" glazing) and/or reducing the amount of energy dissipated to the outside (called "low-E" or "low-emissivity" glazing) brought about by the ever increasing use of glazed surfaces in buildings.

The glazing may also be integrated into glazing units having particular functionalities, such as, for example, heating glazing or electrochromic glazing.

BACKGROUND OF THE INVENTION

One type of multilayer coating known for giving substrates such properties consists of a metallic functional layer having reflection properties in the infrared and/or in solar radiation, especially a metallic functional layer based on silver or on a metal alloy containing silver.

In this type of multilayer coating, the functional layer is thus placed between two dielectric films each comprising in general several layers that are each made of a dielectric material of the nitride type, and especially silicon nitride or aluminum nitride, or of the oxide type. From the optical standpoint, the purpose of these films that flank the metallic functional layer is to "antireflect" this metallic functional layer.

However, a blocker film is sometimes interposed between one or each dielectric film and the metallic functional layer, the blocker film placed beneath the functional layer in the direction of the substrate protects said functional layer during an optional high-temperature heat treatment of the bending and/or tempering type, and the blocker film placed on the functional layer on the opposite side from the substrate protects this layer from any degradation during the deposition of the upper dielectric film and during an optional high-temperature heat treatment of the bending and/or tempering type.

As a reminder, the solar factor SF of glazing is the ratio of the total solar energy entering a room through this glazing to the total incident solar energy, and the selectivity S corresponds to the ratio of the light transmission $T_{Lvis}$ in the visible of the glazing to the solar factor of the glazing, and is such that: $S=T_{Lvis}/SF$.

Currently, there are low-E thin-film multilayer coatings comprising a single functional layer (denoted hereinafter by the expression "multilayer coating comprising a single functional layer") based on silver, having a normal emissivity $\in_N$ of around 2 to 3%, a light transmission in the visible $T_L$ of around 65% and a selectivity of the order of 1.3 to 1.35 for a solar factor of about 50% when mounted in a conventional double-glazing unit, such as for example on face 3 of the following configuration: 4-16(Ar-90%)-4, consisting of two 4 mm glass sheets separated by a gas-filled cavity containing 90% argon and 10% air with a thickness of 16 mm, one of the sheets of which is coated with the multilayer coating comprising a single functional layer, namely the sheet furthest to the inside of the building when considering the incident direction of the solar light entering the building, on its face turned toward the gas-filled cavity.

A person skilled in the art knows that by positioning the thin-film multilayer coating on face 2 of the double glazing (on the sheet furthest to the outside of the building when considering the incident direction of the solar light entering the building and on its face turned toward the gas-filled cavity) he can reduce the solar factor and thus increase the selectivity.

Within the context of the above example, it is then possible to obtain a selectivity of around 1.5 with the same multilayer coating comprising a single functional layer.

However, this solution is unsatisfactory for some applications since the light reflection in the visible, and in particular the light reflection in the visible seen from outside the building, is of a relatively high level, above 20% and about 23 to 25%.

To reduce this light reflection, while still maintaining energy reflection, or even increasing energy reflection, a person skilled in the art knows that it is possible to introduce one or more layers, which is/are absorbent in the visible, into the multilayer coating and more particularly into one or more of the dielectric films.

It appears that certain rules have to be respected when positioning a multilayer coating in a multiple glazing unit, according to the position of the layer or layers comprising a single functional layer absorbent in the visible—it is this that forms the subject matter of the present invention.

It should be noted that the prior art already teaches the use of such layers which are absorbent in the visible in multilayer coatings comprising several functional layers, in particular international patent application WO 02/48065 which relates to the usage of such layers which are absorbent in the visible in a multilayer coating resistant to a heat treatment of the bending/tempering type.

However, because of the complexity of the multilayer coating and the amount of material deposited, these multilayer coatings comprising several functional layers are more costly to manufacture than multilayer coatings comprising a single functional layer.

Moreover, also because of the complexity of this multilayer coating comprising two functional layers, the teaching of the above document cannot be directly transposed for designing a multilayer coating comprising a single functional layer.

BRIEF SUMMARY OF THE INVENTION

One object of the invention is to succeed in eliminating the drawbacks of the prior art, by developing a novel type of multilayer coating comprising a single functional layer, which coating has a low sheet resistance (and therefore a low emissivity), a high light transmission and a relatively neutral color, in particular in reflection on the multilayer coating side (but also on the opposite side, namely the "substrate side"), these properties preferably being maintained within a restricted range whether or not the multilayer coating undergoes one or more high-temperature heat treatments of the bending and/or tempering and/or annealing type.

Another important object is to provide a multilayer coating comprising a single functional layer and that has a low emissivity while still having a low light reflection in the visible and an acceptable color, especially in external reflection, of the multiple glazing, in particular one not in the red.

DETAILED DESCRIPTION OF THE INVENTION

Thus, one subject of the invention, in its broadest acceptance, is multiple glazing as claimed in claim 1 or claim 2. This multiple glazing comprises at least two substrates or at least three substrates respectively, which are held together by a frame structure, said glazing providing a separation between an external space and an internal space, in which at least one gas-filled cavity lies between the two substrates, one substrate being coated on an inner face in contact with the gas-filled cavity with a thin-film multilayer coating having reflection properties in the infrared and/or in solar radiation, said coating comprising a single metallic functional layer, in particular based on silver or a metal alloy containing silver, and two dielectric films, said films each comprising at least two dielectric layers, said functional layer being placed between the two dielectric films. According to the invention the two dielectric films each include at least one absorbent layer which is placed in each of the two dielectric films between two dielectric layers, the total absorbent material of these two absorbent layers being symmetrically placed on either side of the metallic functional layer.

Preferably, a single substrate of the multiple glazing comprising at least two substrates or of the multiple glazing comprising at least three substrates is coated on an inner face in contact with the gas-filled cavity with a thin-film multilayer coating having reflection properties in the infrared and/or in solar radiation.

The term "symmetrically" should be understood within the present invention to mean that half of the total thickness of the absorbent material of the absorbent layer or layers of the multilayer coating is located in the dielectric film subjacent to the metallic functional layer and that the other half of the total thickness of the absorbent material of the absorbent layer or layers of the multilayer coating is located in the dielectric film superjacent to the metallic functional layer.

In the context of the invention, the absorbent material present in the multilayer coating, other than within the dielectric films, is not taken into consideration when interpreting the word "symmetrically". Thus, the optionally present blocker layer or layers, which is or are in contact with or close to the functional layer, does/do not form part of the absorbent material taken into consideration when interpreting the wording "symmetrically".

The term "film" should be understood within the context of the present invention to mean that there may be a single layer or several layers of different materials within the film.

As usual, the term "dielectric layer" within the present invention should be understood to mean that, from the standpoint of its nature, the material is "nonmetallic", i.e. is not a metal. In the context of the invention, this term denotes a material having an n/k ratio over the entire visible wavelength range (from 380 nm to 780 nm) equal to or greater than 5.

The term "absorbent material" within the present invention is understood to mean a material having an n/k ratio over the entire visible wavelength range (from 380 nm to 780 nm) between 0 and 5, excluding these values, and having an electrical resistivity in the bulk state (as known from the literature) of greater than $10^{-5}$ Ω·cm.

It will be recalled that n denotes the real refractive index of the material at a given wavelength and k represents the imaginary part of the refractive index at a given wavelength, the ratio n/k being calculated at the same given wavelength for both n and k.

Within each dielectric film, the two dielectric layers that flank an absorbent layer are preferably of the same nature. The composition (stoichiometry) of the dielectric layers is thus identical on each side of the absorbent layer.

In one particular version of the invention, at least one substrate has, on at least one face in contact with a gas-filled cavity, an antireflection film which, in relation to said gas-filled cavity, is opposite a thin-film multilayer coating having reflection properties in the infrared and/or in solar radiation.

This version makes it possible to achieve an even higher selectivity thanks to a significant increase in the light transmission and in a lesser increase in the solar factor of the multiple glazing.

In one particular version of the invention, at least one absorbent layer of the multilayer coating, and preferably all the absorbent layers of the multilayer coating, is or are based on a nitride and in particular at least one layer of these layers and preferably all these layers is (are) based on niobium nitride NbN or at least one layer of these layers and preferably all these layers is (are) based on titanium nitride TiN.

The absorbent material of the absorbent layers within the dielectric films preferably has a thickness between 0.5 and 10 nm, including these values, or even between 2 and 8 nm, including these values, so as to maintain a light transmission equal to or greater than 25%, or even equal to or greater than 30%, in multiple glazing.

The dielectric layer, which is at least within each dielectric film, as defined above, has an optical index between 1.8 and 2.5, including these values, or preferably between 1.9 and 2.3, including these values (the optical indices—or refractive indices—indicated here are those measured at 550 nm, as is usual).

In one particular embodiment, said subjacent dielectric films and superjacent dielectric films each comprise at least one dielectric layer based on silicon nitride optionally doped with at least one other element, such as aluminum.

In one particular embodiment of the invention, each absorbent layer is placed in the dielectric film between two dielectric layers which are both based on silicon nitride, optionally doped with at least one other element, such as aluminum.

In one particular embodiment, the final layer or overcoat of the subjacent dielectric film, the one furthest away from the substrate, is a wetting layer based on an oxide, especially based on zinc oxide, optionally doped with at least one other element, such as aluminum.

In a most particular embodiment, the subjacent dielectric film comprises at least one dielectric layer based on a nitride, especially silicon nitride and/or aluminum nitride, and at least one noncrystalline smoothing layer made of a mixed oxide, said smoothing layer being in contact with a crystalline superjacent wetting layer.

Preferably, the functional layer is placed directly on an underblocker film placed between the functional layer and the dielectric film subjacent to the functional layer, and/or the functional layer is deposited directly beneath an overblocker film placed between the functional layer and the dielectric film superjacent to the functional layer and the underblocker film and/or the overblocker film comprise/comprises a thin layer based on nickel or titanium having a geometric thickness e such that 0.2 nm≤e≤2.5 nm.

Moreover, the underblocker film and/or the overblocker film may comprise at least one thin layer based on nickel or titanium present in metallic form if the substrate provided with the thin-film multilayer coating has not undergone bending and/or tempering heat treatment after the coating has been deposited, this layer being at least partially oxidized if the substrate provided with the thin-film multilayer coating has undergone at least one bending and/or tempering heat treatment after deposition of the multilayer coating.

The thin nickel-based layer of the underblocker film and/or the thin nickel-based layer of the overblocker film, when said layer is present, are/is preferably in direct contact with the functional layer.

In one particular embodiment, the final layer or overcoat of the superjacent dielectric film, that furthest away from the substrate, is based on an oxide, preferably deposited substoichiometrically, and is especially based on titanium oxide ($TiO_x$) or based on a mixed tin zinc oxide ($SnZnO_x$), optionally doped by another element in an amount of at most 10% by weight.

The multilayer coating may thus include an overcoat, i.e. a protective layer, preferably deposited substoichiometrically. This layer is essentially oxidized stoichiometrically in the multilayer coating after deposition.

This protective layer preferably has a thickness between 0.5 and 10 nm.

The glazing according to the invention incorporates at least the substrate bearing the multilayer coating according to the invention, optionally joined to at least one other substrate. Each substrate may be clear or tinted. In particular, at least one of the substrates may be made of bulk-tinted glass. The choice of coloration type will depend on the level of light transmission and/or on the colorimetric appearance that is/are desired for the glazing once its manufacture has been completed.

The glazing according to the invention may have a laminated structure, especially one combining at least two rigid substrates of the glass type with at least one sheet of thermoplastic polymer, so as to have a structure of the type: glass/thin-film multilayer coating/sheet(s)/glass/gas-filled cavity/glass sheet. The polymer may especially be based on polyvinyl butyral PVB, ethylene-vinyl acetate EVA, polyethylene terephthalate PET or polyvinyl chloride PVC.

The substrates of the glazing according to the invention are capable of undergoing a heat treatment without the thin-film multilayer coating being damaged. Optionally, said substrates are curved and/or tempered.

The subject of the invention is also the process for manufacturing multiple glazing according to the invention, comprising at least two substrates that are held together by a frame structure, said glazing providing a separation between an external space and an internal space, in which at least one gas-filled cavity lies between the two substrates, one substrate being coated on an inner face in contact with the gas-filled cavity with a thin-film multilayer coating having reflection properties in the infrared and/or in solar radiation, said coating comprising a single metallic functional layer, in particular based on silver or a metal alloy containing silver, and two dielectric films, said films each comprising at least two dielectric layers, said functional layer being placed between the two dielectric films, the two dielectric films each including at least one absorbent layer which is placed in each dielectric film between two dielectric layers, the absorbent material of the absorbent layers being symmetrically placed on either side of the metallic functional layer.

When two dielectric layers flanking an absorbent layer are deposited by reactive sputtering in the presence of nitrogen and/or oxygen, then the absorbent layer deposited between these two layers is preferably also deposited in the presence of nitrogen and/or oxygen respectively.

The invention also relates to the use of a thin-film multilayer coating having reflection properties in the infrared and/or in solar radiation, comprising a single metallic functional layer, in particular based on silver or on a metal alloy containing silver, and two dielectric films, said films each comprising at least one dielectric layer, said functional layer being placed between the two dielectric films and said thin-film multilayer coating being placed on an inner face of at least one substrate for producing multiple glazing according to the invention, comprising at least two substrates which are held together by a frame structure, in which glazing a gas-filled cavity lies between two substrates.

Advantageously, the present invention thus makes it possible to produce a thin-film multilayer coating comprising a single functional layer having, in a multiple glazing configuration, and especially a double-glazing configuration, a high selectivity (S≥1.40), a low emissivity ($\epsilon_N$≤3%) and an esthetically attractive appearance ($T_{Lvis}$≥60%; external $R_{Lvis}$≤25%, or external $R_{Lvis}$≤20% or even external $R_{Lvis}$<20%; and neutral colors in external reflection), whereas, hitherto, only in multilayer coatings comprising two functional layers could this combination of criteria be met.

The multilayer coating comprising a single functional layer according to the invention costs less to produce than a multilayer coating comprising two functional layers having similar characteristics ($T_{Lvis}$, $R_{Lvis}$ and neutral colors in external reflection).

Also advantageously, the present invention provides a multilayer coating comprising a single functional layer with absorbent layers, for which it is unnecessary to pay attention to the orientation thereof: the multilayer coating may be placed regardlessly on whatever inner face of the multiple glazing (for example, it does matter if it is on face 2 or face 3 of conventional double glazing).

BRIEF DESCRIPTION OF THE SEVERAL VIEWS OF THE DRAWINGS

The details and advantageous features of the invention will emerge from the following nonlimiting examples illustrated by means of the hereto-appended figures illustrating.

In these figures, the proportions between the thicknesses of the various layers or of the various elements have not been strictly respected in order to make them easier to examine.

Figure 1:
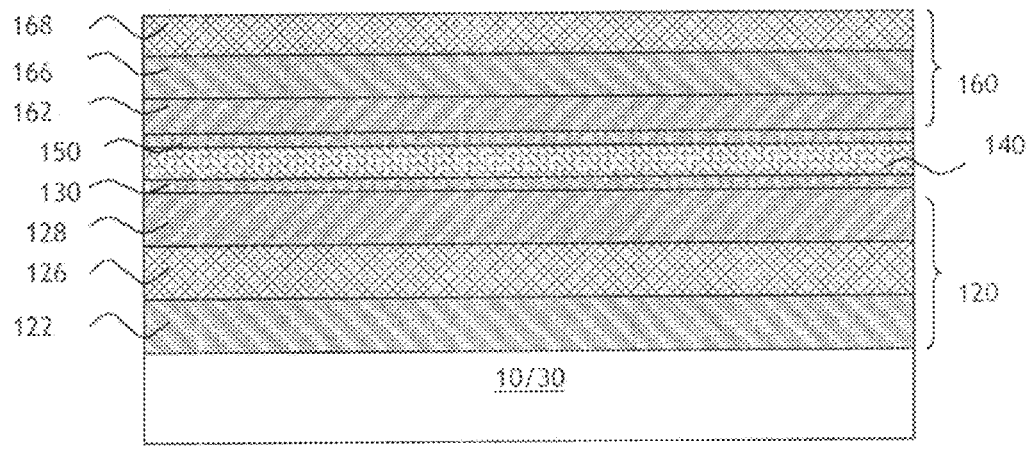
in FIG. 1, a multilayer coating comprising a single functional layer according to the prior art, the functional layer being provided with an underblocker film and with an overblocker film.

FIG. 1 illustrates the structure of a multilayer coating comprising a single functional layer of the prior art deposited on a transparent glass substrate 10, 30, in which the single functional layer 140, in particular based on silver or on a metal alloy containing silver, is placed between two dielectric films, namely the subjacent dielectric film 120 lying beneath the functional layer 140 in the direction of the substrate 10, 30 and the superjacent dielectric film 160 lying above the functional layer 140 on the opposite side on the substrate 10, 30.

These two dielectric films 120, 160 each comprise at least two dielectric layers 122, 126, 128; 162, 166, 168.

Optionally, on the one hand the functional layer 140 may be deposited on an underblocker film 130 placed between the subjacent dielectric film 120 and the functional layer 140 and, on the other hand, the functional layer 140 may be deposited directly beneath an overblocker film 150 placed between the functional layer 140 and the superjacent dielectric film 160.

This dielectric film 160 may terminate in an optional protective layer 168, particularly one based on an oxide, especially an oxygen-substochiometric oxide.

When a multilayer coating comprising a single functional layer is used in multiple glazing 100 of double-glazing structure, this glazing comprises two substrates 10, 30 that are held together by a frame structure 90 and are separated from each other by a gas-filled cavity 15.

The glazing thus provides a separation between an external space ES and an internal space IS.

The multilayer coating may be positioned on face 2 (on the glass sheet furthest away to the outside of the building considering the incident direction of the solar light entering the building and on its face turned toward the gas cavity) or on face 3 (on the sheet closest to the inside of the building considering the incident direction of the solar light entering the building and on its face turned toward the gas cavity).

Figure 2:
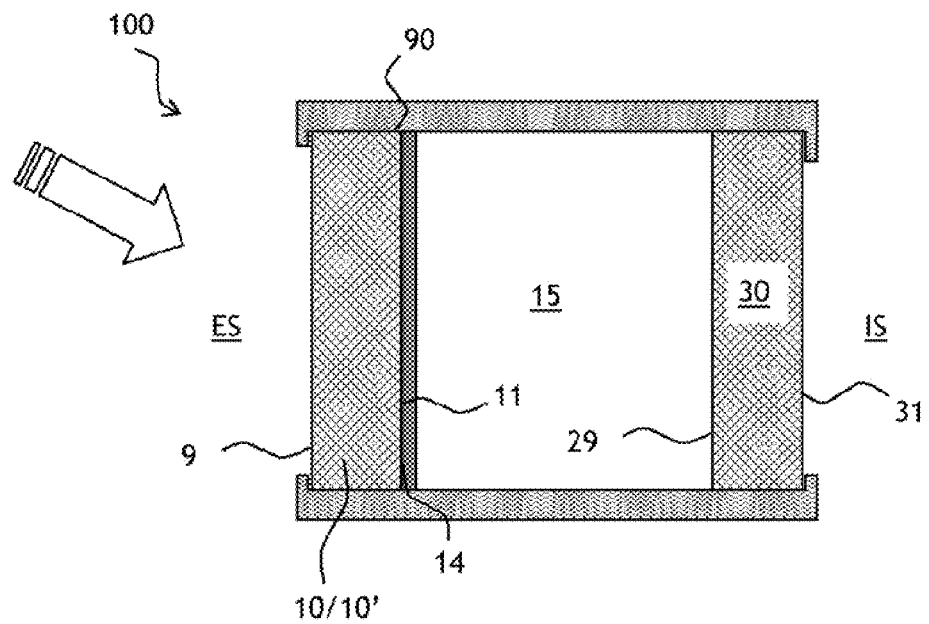
in FIGS. 2 and 3, two double-glazing solutions incorporating a multilayer coating comprising a single functional layer.
Figure 3:
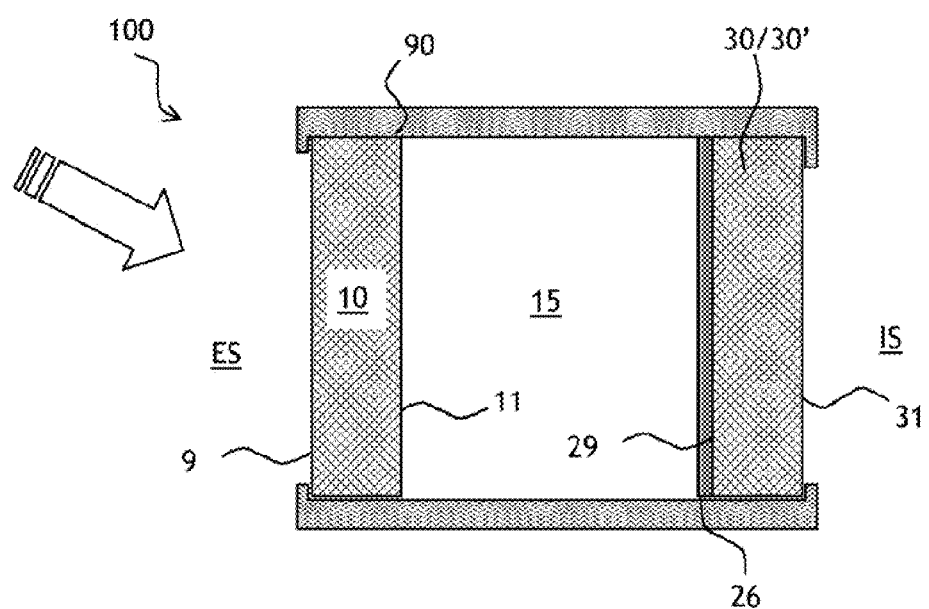

FIGS. 2 and 3 illustrate the positioning (the incident direction of the solar light entering the building being illustrated by the double-sided arrow), respectively:

on face 2 of a thin-film multilayer 14 positioned on an inner face 11 of the substrate 10 in contact with the gas-filled cavity 15, the other face 9 of the substrate 10 being in contact with the external space ES; and on face 3 of a thin-film multilayer coating 26 positioned on an inner face 29 of the substrate 30 in contact with the gas-filled cavity 15, the other face 31 of the substrate 30 being in contact with the internal space IS.

However, it may also be envisioned in this double-glazing structure for one of the substrates to have a laminated structure; however, there is no possible confusion since in such a structure there is no gas-filled cavity.

Furthermore, provision may be made, although this is not illustrated, for at least one substrate 10, 30 to include, on at least one face 11 (in the case of FIG. 3) or face 29 (in the case of FIG. 2) in contact with the gas-filled cavity 15, said substrate not having a thin-film multilayer coating having reflection properties in the infrared and/or in solar radiation, an antireflection film which, in relation to said gas-filled cavity 15, is opposite the thin-film multilayer coating 14 (in the case of FIG. 2) and the thin-film multilayer coating 26 (in the case of FIG. 3) having reflection properties in the infrared and/or in solar radiation.

The purpose of inserting an antireflection film into a double-glazing structure is to make it possible to obtain a high light transmission and a high solar factor.

A series of three examples was produced, each example being numbered 1 to 3.

In accordance with the teaching of international patent application WO 2007/101964, the subjacent dielectric film 120 may include a dielectric layer 122 based on silicon nitride and at least one noncrystalline smoothing layer 126 made of a mixed oxide, in this case a mixed zinc tin oxide which here is antimony-doped (said oxide being deposited using a metal target having the respective Zn:Sn:Sb mass ratios of 65:34:1), said smoothing layer 126 being in contact with a superjacent wetting layer 128.

In this multilayer coating, the wetting layer 128 made of aluminum-doped zinc oxide ZnO:Al (deposited using a metal target consisting of zinc doped with 2% aluminum by weight) makes it possible to improve the crystallization of the silver, thereby increasing its conductivity; this effect is accentuated by the use of an amorphous $SnZnO_x$:Sb smoothing layer, which improves ZnO growth and therefore silver growth.

The superjacent dielectric film 160 may comprise at least one dielectric layer 162 made of aluminum-doped zinc oxide ZnO:Al (deposited using a metal target consisting of zinc doped with 2% aluminum by weight) and a silicon-nitride-based dielectric layer 166.

The silicon nitride layers 122, 166 are $Si_3N_4$ layers and are deposited using a metal target doped with 8% aluminum by weight.

These multilayer coatings also have the advantage of being able to be tempered, that is to say they can withstand a tempering heat treatment and their optical properties vary little upon carrying out this heat treatment.

For all the examples above, the conditions for depositing the layers are:

| Layer | Target used | Deposition pressure | Gas |
| --- | --- | --- | --- |
| $Si_3N_4$ | 92:8 wt % Si:Al | $1.5 \times 10^{-3}$ mbar | Ar/(Ar + N2): 45% |
| NbN | Nb | $1.5 \times 10^{-3}$ mbar | Ar/(Ar + N2): 45% |
| SnZnO | 34/65:1 wt % SnZn:Sb | $2 \times 10^{-3}$ mbar | Ar/(Ar + O2): 58% |
| ZnO | 98:2 wt % Zn:Al | $2 \times 10^{-3}$ mbar | Ar/(Ar + O2): 52% |
| NiCr | 80/20 wt % NiCr | $2 \times 10^{-3}$ mbar | Ar: 100% |
| Ag | Ag | $2 \times 10^{-3}$ mbar | Ar: 100% |

Thus, the deposited layers may be grouped into three categories:

i) layers made of dielectric material, having an n/k ratio over the entire visible wavelength range of greater than 5: $Si_3N_4$, SnZnO, ZnO ii) layers made of absorbent material, having an n/k ratio such that 0<n/k<5 over the entire visible wavelength range and an electrical resistivity in the bulk state greater than $10^{-5}$ $\Omega \cdot cm$:NbN;

iii) metallic functional layers made of material having reflection properties in the infrared and/or in solar radiation: Ag It has been found that the silver also has an n/k ratio such that 0<n/k<5 over the entire visible wavelength range, but its electrical resistivity in the bulk state is less than $10^{-5}$ $\Omega \cdot cm$.

It has also been found that the materials Ti, NiCr, TiN and Nb may constitute layers made of absorbent material according to the definition given above.

For all the examples hereinafter, the thin-film multilayer coating is deposited on a substrate made of clear soda-lime glass with a thickness of 4 mm of the Planilux trademark, distributed by Saint-Gobain.

For these substrates:

R indicates the sheet resistance of the multilayer coating in ohms per square;

$T_L$ indicates the light transmission in the visible in %, measured at 2° under illuminant $D_{65}$;

$a_T^*$ and $b_T^*$ indicate the colors in transmission a* and b* in the LAB system measured at 2° under illuminant $D_{65}$;

$R_c$ indicates the light reflection in the visible in %, measured at 2° under illuminant $D_{65}$, on that side of the substrate coated with the thin-film multilayer coating;

$a_c^*$ and $b_c^*$ indicate the colors in transmission a* and b* in the LAB system measured at 2° under illuminant $D_{65}$, on the coated substrate side;

$R_g$ indicates the light reflection in the visible in %, measured at 2° under illuminant $D_{65}$, on the bare substrate side; and $a_g^*$ and $b_g^*$ indicate the colors in transmission a* and b* in the LAB system measured at 2° under illuminant $D_{65}$ on the bare substrate side.

Moreover, for these examples, in all cases where a heat treatment has been applied to the substrate, this is an annealing treatment carried out for about 6 minutes at a temperature of about 620° C. after which the substrate is cooled with the ambient air (at about 20° C.) so as to simulate a bending or tempering heat treatment.

Furthermore, for these examples, when the substrate carrying the multilayer coating is integrated into double glazing, this has the 4-16-4 (90% Ar) structure, i.e. two glass substrates, each with a thickness of 4 mm that are separated by a 16 mm thick gas cavity consisting of 90% argon and 10% air.

With all the above examples, in this double-glazing configuration, it is possible to achieve a U coefficient, or K coefficient, calculated according to the EN 673 standard, of around 1.1 $W \cdot m^{-2} \cdot K^{-1}$ (i.e. the thermal transmission coefficient through the glazing, denoting the amount of heat passing through the substrate in the steady state per unit area and for a unit temperature difference between that face of the glazing in contact with the external space and that face of the glazing in contact with the internal space).

For these double-glazing units:

SF indicates the solar factor, i.e. the ratio, as a percentage, of the total solar energy entering the room through the glazing to the total incident solar radiation;

S indicates the selectivity corresponding to the ratio of the light transmission $T_L$ in the visible to the solar factor SF, such that $S = T_{Lvis}/SF$;

$T_L$ indicates the light transmission in the visible in %, measured at 2° under illuminant $D_{65}$;

$a_T^*$ and $b_T^*$ indicate the colors in transmission a* and b* in the LAB system measured at 2° under illuminant $D_{65}$;

$R_e$ indicates the external light reflection in the visible in %, measured at 2° under illuminant $D_{65}$, on the external space ES side;

$a_e^*$ and $b_e^*$ indicate the colors in external reflection a* and b* in the LAB system measured at 2° under illuminant $D_{65}$ on the external space ES side;

$R_i$ indicates the internal light reflection in the visible in %, measured at 2° under illuminant $D_{65}$, on the internal space IS side; and $a_i^*$ and $b_i^*$ indicate the colors in internal reflection a* and b* in the LAB system, measured at 2° under illuminant $D_{65}$, on the internal space IS side.

Example 1 was produced according to the coating structure illustrated in FIG. 1, without the absorbent layer according to the invention and without, however, the optional protective layer 168 and the underblocker film 130.

Table 1 below illustrates the geometric or physical thicknesses (and not the optical thicknesses) in nanometers of each of the layers of Example 1:

TABLE 1

| Layer | Material | Ex. 1 |
|---|---|---|
| 168 | $SnZnO_x$:Sb | 4 |
| 166 | $Si_3N_4$:Al | 28 |
| 162 | ZnO:Al | 20 |
| 150 | NiCr | 1 |
| 140 | Ag | 15 |
| 128 | ZnO:Al | 4 |
| 126 | $SnZnO_x$:Sb | 5 |
| 122 | $Si_3N_4$:Al | 21 |

Table 2 below summarizes the main optical and energy characteristics of this Example 1, when considering only the 10/30 substrate alone before heat treatment, when considering the substrate 10'/30' alone after a heat treatment and when these substrates have been mounted as double glazing, on face 2, F2, as in FIG. 2 and as face 3, F3, as in FIG. 3, respectively.

For the two F2 rows, the top row indicates the data obtained with the substrate 10 and the bottom row indicates the data obtained with the substrate 10' that has undergone a heat treatment. Likewise, for the two F3 rows, the top row indicates the data obtained with the substrate without heat treatment (which is therefore the substrate 30) and the bottom row indicates the data obtained with the substrate that has undergone a heat treatment (which is then the substrate 30').

TABLE 2

|  | R | $T_L$ | $a_T^*$ | $b_T^*$ | $R_c$ | $a_c^*$ | $b_c^*$ | $R_g$ | $a_g^*$ | $b_g^*$ |
|---|---|---|---|---|---|---|---|---|---|---|
| 10 | 2.9 | 71.3 | −2.9 | 5.4 | 18.1 | 2.9 | −13.2 | 21.6 | 0.8 | −10.4 |
| 10' | 2.3 | 73.5 | −3.5 | 4.0 | 18.9 | 5.0 | −10.7 | 20.9 | 3.0 | −9.0 |

|  | SF | s | $T_L$ | $a_T^*$ | $b_T^*$ | $R_e$ | $a_e^*$ | $b_e^*$ | $R_i$ | $a_i^*$ | $b_i^*$ |
|---|---|---|---|---|---|---|---|---|---|---|---|
| F2 | 44.1 | 1.47 | 64.8 | −3.8 | 5.3 | 26.1 | −0.8 | −7.1 | 23.3 | 0 | −8.9 |
|  | 44.8 | 1.49 | 66.6 | −4.3 | 4.1 | 25.5 | 1.1 | −6.4 | 23.6 | 1.5 | −7.0 |
| F3 | 50.0 | 1.30 | 64.8 | −3.8 | 5.3 | 23.3 | 0 | −8.9 | 26.1 | −0.8 | −7.1 |
|  | 48.9 | 1.36 | 66.6 | −4.3 | 4.1 | 23.6 | 1.5 | −7.0 | 25.5 | 1.1 | −6.4 |

Thus, as may be seen in Table 2, the light transmission $T_L$ in the visible of the glazing is around 65% and the color in external reflection is relatively neutral.

However, the external light reflection $R_e$ is not completely satisfactory in the sense that it may appear too high both on face 2 and on face 3, and it is therefore desirable to reduce it to a value equal to or less than 20%, or even to a value of equal to or less than 15%, without the other parameters, and in particular the color parameters, being affected.

Figure 4:
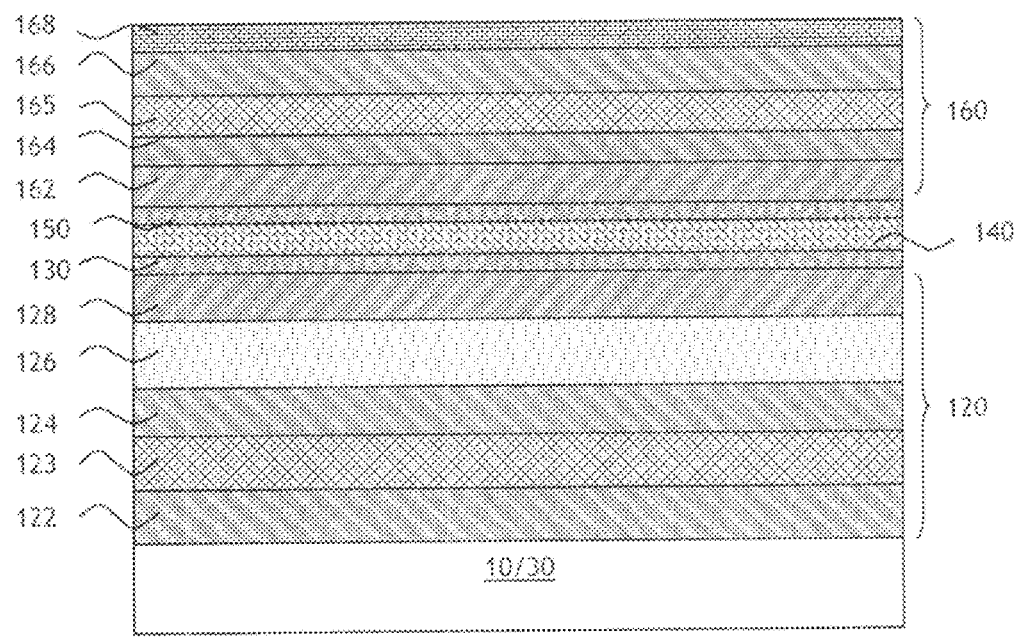
in FIG. 4, a multilayer coating comprising a single functional layer according to the invention, the functional layer being provided with an underblocker film and with an overblocker film; and in FIGS. 5 and 6, two triple-glazing solutions incorporating a multilayer coating comprising a single functional layer.

The examples, numbered 2 and 3 were then produced on the basis of the multilayer coating illustrated in FIG. 4 by inserting one (or more) absorbent layer(s) made of niobium nitride NbN into the coating.

Table 3 below illustrates the geometric thicknesses in nanometers of each of the layers of these examples:

TABLE 3

| Layer | Material | Ex. 2 | Ex. 3 |
|---|---|---|---|
| 168 | $SnZnO_x$:Sb | 4 | 4 |
| 166 | $Si_3N_4$:Al | 8 | 21 |
| 165 | NbN | 2 | 1.5 |
| 164 | $Si_3N_4$:Al | 12 | 21 |
| 162 | ZnO:Al | 10 | 10 |
| 150 | NiCr | 1 | 1 |
| 140 | Ag | 15 | 12 |
| 128 | ZnO:Al | 6 | 6 |
| 126 | $SnZnO_x$:Sb | 16 | 16 |
| 124 | $Si_3N_4$:Al | 23 | 10 |
| 123 | NbN | 2 | 1.5 |
| 122 | $Si_3N_4$:Al | 23 | 10 |

Examples 2 and 3 are thus substantially the same as Example 1 except that the dielectric layers 122 and 166 have each been divided into two parts of substantially the same thickness (122/124 and 164/166 respectively) and in that an absorbent layer 123, 165 has been inserted each time between these two layers, i.e. substantially in the middle of the layers 122 and 166 of Example 1.

Moreover, the absorbent material of the absorbent layers is placed symmetrically in the subjacent film 120, (i.e. between the carrier substrate and the functional layer 140) and in the superjacent film 160 (i.e. on the functional layer 140, on the opposite side from the carrier substrate): the two absorbent layers 123 and 165 have the same physical thickness; they are both made of the same material and were deposited under the same conditions.

Table 4 below summarizes the main optical and energy characteristics of Examples 2 and 3, when considering only the substrate by itself, without heat treatment, and when said substrate is mounted as this double glazing, whether on face 2, as in FIG. 2 or on face 3, as in FIG. 3, respectively.

TABLE 4

|  | R | $T_L$ | $a_T^*$ | $b_T^*$ | $R_c$ | $a_c^*$ | $b_c^*$ | $R_g$ | $a_g^*$ | $b_g^*$ |
|---|---|---|---|---|---|---|---|---|---|---|
| 10 of Ex 2 | 2.7 | 47.2 | −4.3 | −6.8 | 13.5 | 13.5 | 30.1 | 15.8 | 1.4 | 0.5 |
| 10 of Ex 3 | 3.5 | 62.0 | −2.9 | 2.3 | 5.7 | 4.8 | −26.8 | 9.9 | 2.7 | −7.9 |

|  | SF | S | $T_L$ | $a_T^*$ | $b_T^*$ | $R_e$ | $a_e^*$ | $b_e^*$ | $R_i$ | $a_i^*$ | $b_i^*$ |
|---|---|---|---|---|---|---|---|---|---|---|---|
| Ex. 2 | 33.8 | 1.29 | 43.5 |  |  | 17.6 | 0.7 | −0.2 | 19.1 | 7.9 | 16 |
| Ex. 3 | 44.3 | 1.31 | 58 |  |  | 13.5 | 1.2 | −6.8 | 13.5 | 0.9 | −15.7 |

As may be seen in Table 4, the external light reflection $R_e$ is very satisfactory, having a value of around 15%. It is lower than that of Example 1.

Moreover, the color seen from the outside is little different from that of Example 1 and remains neutral, whether or not the multilayer coating has undergone a heat treatment.

Moreover, in general, the tempering heat treatment has only slightly affected the examples according to the invention.

In particular, the sheet resistance of the multilayer coatings according to the invention, before and after heat treatment is always less than 4 ohms per square.

Examples 2 and 3 show that it is possible to combine a high selectivity, a low emissivity and a low external light reflection with a multilayer coating comprising a single metallic silver functional layer, while still maintaining a suitable esthetic appearance ($T_L$ is greater than 60% and the colors are neutral in external reflection).

In addition, the light reflection $R_L$, the light transmission $T_L$, both measured under illuminant $D_{65}$, and the colors in reflection a* and b* in the LAB system, measured under illuminant $D_{65}$, on the substrate side do not vary really significantly upon carrying out the heat treatment.

By comparing the optical and energy characteristics before heat treatment with these same characteristics after heat treatment, no major degradation was observed.

Furthermore, the mechanical strength of the multilayer coating according to the invention is very good. Moreover, the overall general chemical resistance of this coating is good.

When a multilayer coating comprising a single functional layer is used in multiple glazing 100 of triple-glazing structure, this glazing comprises three substrates 10, 20, 30 that are held together by a frame structure 90 and are separated, pairwise, by a gas-filled cavity 15, 25 respectively. The glazing thus provides a separation between an external space ES and an internal space IS.

The multilayer coating may be positioned on face 2 (on the glass sheet furthest away to the outside of the building considering the incident direction of the solar light entering the building and on its face turned toward the gas cavity) or face 5 (on the sheet closest to the inside of the building considering the incident direction of the solar light entering the building and on its face turned toward the gas cavity).

Figure 5:
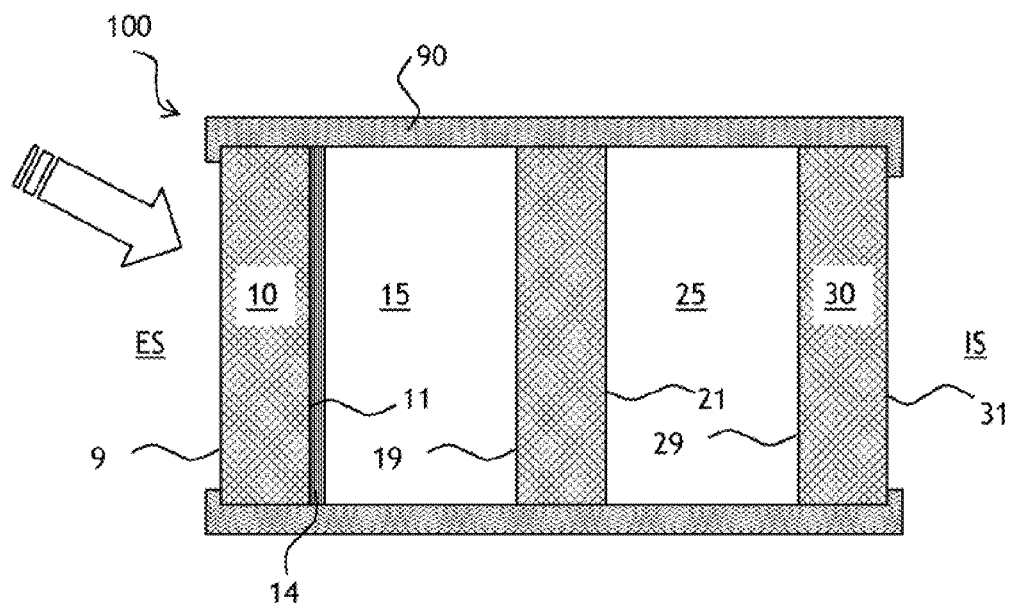
Figure 6:
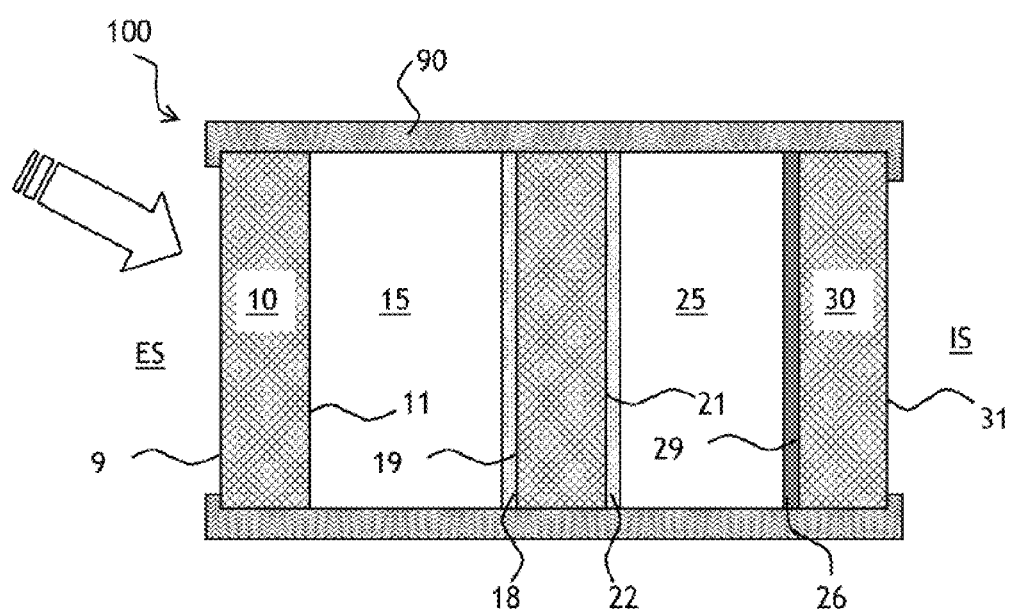

FIGS. 5 and 6 illustrate the positioning, respectively:
on face 2, of a thin-film multilayer coating 14 positioned on an inner face 11 of the substrate 10 in contact with the gas-filled cavity 15, the other face 9 of the substrate 10 being in contact with the external space ES; and
on face 5 of a thin-film multilayer coating 26 positioned on an inner face 29 of the substrate 30 in contact with the gas-filled cavity 25, the other face 31 of the substrate 30 being in contact with the internal space IS.

However, it may also be envisioned in this triple-glazing structure for one of the substrates to have a laminated structure. However, there is no possible confusion as in such a structure there is no gas-filled cavity.

Furthermore, provision may be made for at least one substrate 10, 20, 30 to include, on at least one face 11, 19, 21, 29 in contact with a gas-filled cavity 15, 25, an antireflection film 18, 22 which, relative to said gas-filled cavity 15, 25, is opposite a thin-film multilayer coating 14, 26, having reflection properties in the infrared and/or in solar radiation.

FIG. 6 thus illustrates the case in which the central substrate 20 of the triple glazing includes, on its face 21, which is in contact with the gas-filled cavity 25, an antireflection film 22 which, in relation to said gas-filled cavity 25, is opposite the thin-film multilayer coating 26 having reflection properties in the infrared and/or in solar radiation.

Of course, if in the context of implementing the invention the thin-film multilayer coating 14 having reflection properties in the infrared and/or in solar radiation is positioned on the face 11 of the substrate 10, it is then the face 19 of the central substrate 20 of the triple glazing which is in contact with the gas-filled cavity 15, which includes an antireflection film 18 which, in relation to said gas-filled cavity 15, is opposite the thin-film multilayer coating 14.

In both these cases, provision may also be made for the other face of the central substrate 20 of the triple glazing to have an antireflection film, as illustrated for the first of these two cases in FIG. 6.

The purpose of this insertion of one (or more) antireflection film(s) in a triple-glazing structure is to allow a high light transmission and a high solar factor to be achieved, at the very least a light transmission and a solar factor that are similar to those of double glazing with enhanced thermal insulation.

The present invention has been described above by way of example. Of course, a person skilled in the art is capable of producing various alternative forms of the invention without thereby departing from the scope of the patent as defined by the claims.

The invention claimed is:

1. A multiple glazing, comprising:
    at least a first and a second substrate which are held together by a frame structure; and
    a separation between an external space and an internal space, in which at least one gas-filled cavity lies between the two substrates,
    wherein one of the substrates is coated on an inner face in contact with the gas-filled cavity with a thin-film multi-layer coating having reflection properties for at least one selected from the group consisting of infrared radiation and solar radiation,
    wherein the thin-film multilayer coating comprises a single metallic functional layer and two dielectric films,
    wherein the single metallic functional layer is placed between the two dielectric films,
    wherein the dielectric films each comprise at least two dielectric layers,
    wherein the two dielectric films each comprise at least one absorbent layer which is placed in the dielectric film between two dielectric layers, and
    wherein absorbent material of the absorbent layers is symmetrically placed on either side of the metallic functional layer.

2. A multiple glazing, comprising:
    at least a first, a second, and a third substrate that are held together by a frame structure; and
    a separation between an external space and an internal space, in which at least two gas-filled cavities each lie between two substrates,
    wherein one of the substrates is coated on an inner face in contact with the gas-filled cavity with a thin-film multi-layer coating having reflection properties for at least one selected from the group consisting of infrared radiation and solar radiation,
    wherein the thin-film multilayer coating comprises a single metallic functional layer and two dielectric films,
    wherein the dielectric films each comprise at least two dielectric layers,
    wherein the single metallic functional layer is placed between the two dielectric films,
    wherein the two dielectric films each comprise at least one absorbent layer which is placed in the dielectric film between two dielectric layers, and
    wherein absorbent material of the absorbent layers is symmetrically placed on either side of the metallic functional layer.

3. The glazing of claim 1, wherein at least one of the substrates comprises, on at least one face in contact with a gas-filled cavity, an antireflection film which, relative to the gas-filled cavity, is opposite the thin-film multilayer coating.

4. The glazing of claim 1, wherein at least one of the absorbent layers comprises a nitride.

5. The glazing of claim 1, wherein the absorbent material of the absorbent layers has a total thickness between 0.5 and 10 nm, including these values.

6. The glazing of claim 1, wherein subjacent dielectric films and superjacent dielectric films each comprise at least one dielectric layer comprising silicon nitride optionally doped with at least one other element.

7. The glazing of claim 1, wherein each absorbent layer is placed in the dielectric film between two dielectric layers which both comprise silicon nitride, optionally doped with at least one other element.

8. The glazing of claim 1, wherein the functional layer is placed directly on an underblocker film placed between the functional layer and the dielectric film subjacent to the functional layer,
    and/or
    the functional layer is deposited directly beneath an overblocker film placed between the functional layer and the dielectric film superjacent to the functional layer,
    and
    wherein at least one selected from the group consisting of the underblocker film and the overblocker film comprises a thin layer comprising nickel or titanium having a physical thickness, e', such that $0.2 \text{ nm} \leq e' \leq 2.5 \text{ nm}$.

9. The glazing of claim 1, wherein a final layer or overcoat of a superjacent dielectric film, which is furthest away from the substrate, comprises an oxide.

10. A method of manufacturing the glazing of claim 1, comprising placing the thin-film multilayer coating on an inner face of the at least one substrate.

11. The glazing of claim 1, wherein the single metallic functional layer comprises silver.

12. The glazing of claim 2, wherein at least one of the substrates comprises, on at least one face in contact with a gas-filled cavity, an antireflection film which, relative to the gas-filled cavity, is opposite the thin-film multilayer coating.

13. The glazing of claim 1, wherein all the absorbent layers comprises a nitride.

14. The glazing of claim 1, wherein at least one of the absorbent layers comprises niobium nitride NbN or based on titanium nitride TiN.

15. The glazing of claim 1, wherein all the absorbent layers comprise niobium nitride NbN or based on titanium nitride TiN.

16. The glazing of claim 1, wherein the absorbent material of the absorbent layers has a total thickness between 2 and 8 nm, including these values.

17. The glazing of claim 1, wherein each absorbent layer is placed in the dielectric film between two dielectric layers which both comprise silicon nitride, doped with a dopant comprising aluminum.

18. The glazing of claim 1, wherein a final layer or overcoat of a superjacent dielectric film, which is furthest away from the substrate, comprises an oxide, deposited substoichiometrically.

19. The glazing of claim 1, wherein a final layer or overcoat of a superjacent dielectric film, which is furthest away from the substrate, comprises titanium oxide ($TiO_x$).

20. The glazing of claim 1, wherein a final layer or overcoat of a superjacent dielectric film, which is furthest away from the substrate, comprises a mixed tin zinc oxide ($SnZnO_x$).

\* \* \* \* \*